US012110874B2

(12) United States Patent
Hoelzl

(10) Patent No.: US 12,110,874 B2
(45) Date of Patent: Oct. 8, 2024

(54) NACELLE FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 300 days.

(21) Appl. No.: 17/295,183

(22) PCT Filed: Dec. 9, 2019

(86) PCT No.: PCT/AT2019/060425
§ 371 (c)(1),
(2) Date: May 19, 2021

(87) PCT Pub. No.: WO2020/118333
PCT Pub. Date: Jun. 18, 2020

(65) Prior Publication Data
US 2022/0010784 A1    Jan. 13, 2022

(30) Foreign Application Priority Data

Dec. 13, 2018    (AT) .............................. A 51113/2018

(51) Int. Cl.
*F03D 80/70*    (2016.01)
*F03D 1/00*    (2006.01)
*F16J 15/16*    (2006.01)

(52) U.S. Cl.
CPC ............. *F03D 80/70* (2016.05); *F03D 1/101* (2023.08); *F05B 2240/50* (2013.01);
(Continued)

(58) Field of Classification Search
CPC .. F03D 80/70; F05B 2240/50; F05B 2260/98; F16J 15/164
See application file for complete search history.

(56) References Cited

U.S. PATENT DOCUMENTS 3,203,260 A    8/1965    Pierry et al.
6,637,942 B2    10/2003    Dourlens et al.
(Continued)

FOREIGN PATENT DOCUMENTS

AT    509 625 B1    10/2011
AT    516029 A4    2/2016
(Continued)

OTHER PUBLICATIONS

International Search Report in PCT/AT2019/060420, mailed Mar. 5, 2020.
(Continued)

*Primary Examiner* — Justin D Seabe
(74) *Attorney, Agent, or Firm* — Collard & Roe, P.C.

(57) ABSTRACT

A nacelle for a wind turbine includes: a nacelle housing; a rotor hub; and a rotor bearing for bearing the rotor hub on the nacelle housing, wherein the rotor bearing has at least one inner ring element and at least one outer ring element, wherein at least one oil-lubricated sliding bearing element is formed between the inner ring element and the outer ring element. A sealing element is formed between the nacelle housing and the rotor hub and/or between the nacelle housing and a rotor shaft.

12 Claims, 4 Drawing Sheets

Figure 1:
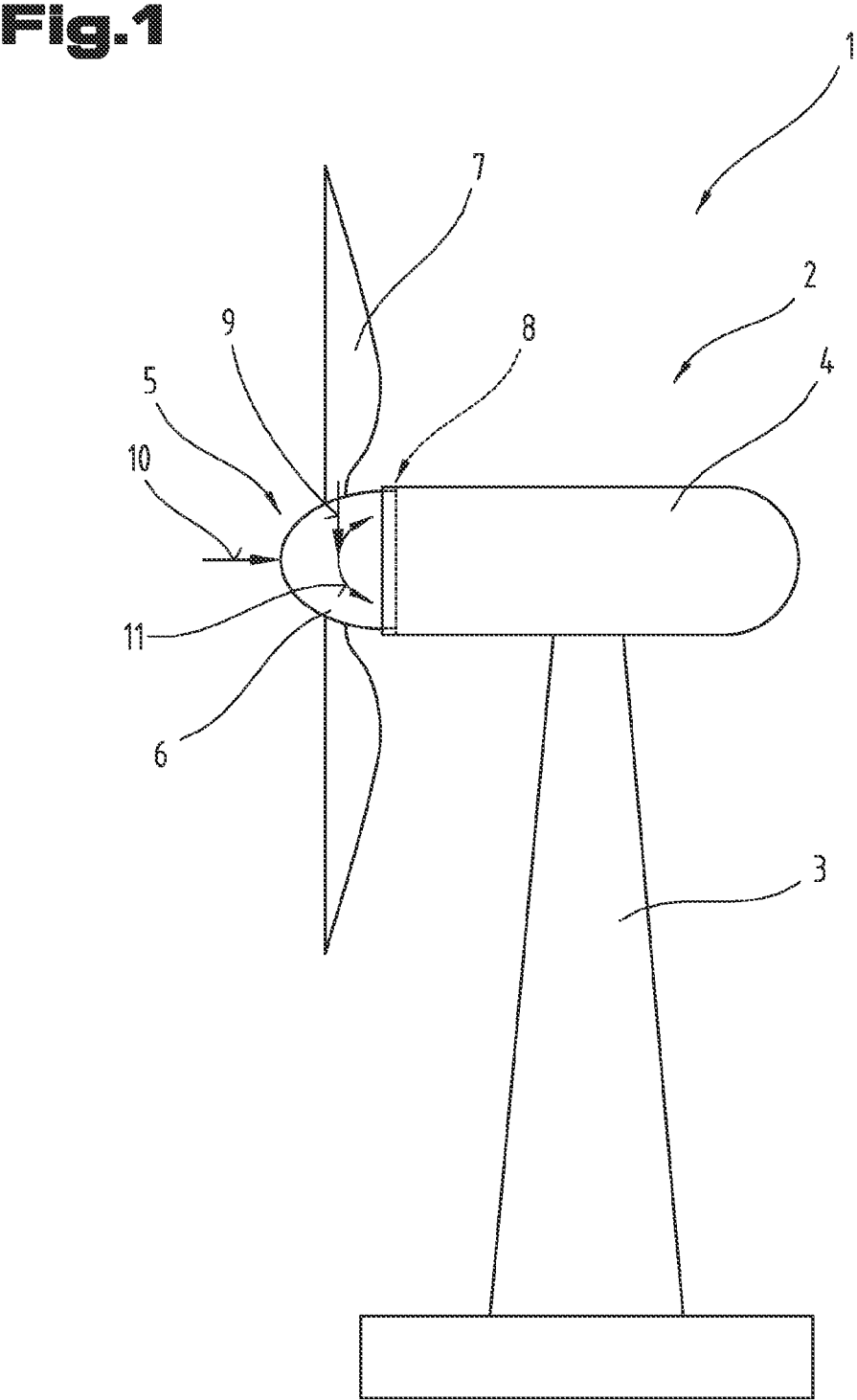

(52) U.S. Cl.
CPC ....... *F05B 2240/57* (2013.01); *F05B 2260/98* (2013.01); *F16C 2300/14* (2013.01); *F16C 2360/31* (2013.01); *F16J 15/164* (2013.01)

(56) References Cited

U.S. PATENT DOCUMENTS

| | | | |
|---|---|---|---|
| 6,866,423 | B2 | 3/2005 | Faltus et al. |
| 7,255,537 | B2 | 8/2007 | Flamang et al. |
| 7,794,151 | B2 | 9/2010 | Neumann |
| 7,832,980 | B2 | 11/2010 | Demtroder et al. |
| 8,545,186 | B2 | 10/2013 | Loeschner et al. |
| 8,591,371 | B2 | 11/2013 | Dinter et al. |
| 8,840,521 | B2 | 9/2014 | Kari et al. |
| 8,974,120 | B2 | 3/2015 | Pedersen et al. |
| 9,057,365 | B2 | 6/2015 | Han et al. |
| 9,206,787 | B2 | 12/2015 | Winkelmann |
| 9,279,413 | B2 | 3/2016 | Ebbesen et al. |
| 9,297,454 | B2 | 3/2016 | Barthel et al. |
| 9,435,376 | B2 | 9/2016 | Gaertner et al. |
| 9,458,880 | B2 | 10/2016 | Kari et al. |
| 9,657,716 | B2 | 5/2017 | Vervoorn et al. |
| 9,677,606 | B2 | 6/2017 | Pischel |
| 9,683,602 | B2 | 6/2017 | Hager et al. |
| 9,784,245 | B2 | 10/2017 | Hager et al. |
| 9,845,826 | B2 | 12/2017 | Sutton et al. |
| 9,869,349 | B2 | 1/2018 | Rittmann et al. |
| 9,995,283 | B2 | 6/2018 | Stiesdal |
| 10,072,704 | B2 * | 9/2018 | Sato .................. F03D 80/70 |
| 10,288,164 | B2 | 5/2019 | Hoelzl |
| 10,436,249 | B2 | 10/2019 | Hoelzl |
| 10,451,176 | B2 | 10/2019 | Hoelzl |
| 10,502,259 | B2 | 12/2019 | Meyer |
| 10,598,214 | B2 | 3/2020 | Hoelzl |
| 10,612,586 | B2 | 4/2020 | Frydendal et al. |
| 10,724,624 | B2 | 7/2020 | Tulokas |
| 11,009,077 | B2 * | 5/2021 | Hofmann .............. F03B 13/264 |
| 11,280,320 | B2 | 3/2022 | Claramunt Estecha et al. |
| 11,384,728 | B2 | 7/2022 | Elmose |
| 11,988,196 | B2 * | 5/2024 | Sasakawa ............... F03D 80/80 |
| 2002/0114549 | A1 | 8/2002 | Hokkirigawa et al. |
| 2003/0063821 | A1 | 4/2003 | Dourlens et al. |
| 2005/0129341 | A1 | 6/2005 | Hoppe |
| 2010/0111459 | A1 | 5/2010 | Yasuda |
| 2011/0254281 | A1 | 10/2011 | Noda et al. |
| 2013/0071246 | A1 | 3/2013 | Kari et al. |
| 2013/0172144 | A1 | 7/2013 | Suzuki et al. |
| 2014/0161614 | A1 | 6/2014 | Vervoorn et al. |
| 2014/0169952 | A1 | 6/2014 | Pedersen et al. |
| 2014/0193262 | A1 | 7/2014 | Pedersen et al. |
| 2014/0193264 | A1 | 7/2014 | Pedersen et al. |
| 2014/0377063 | A1 | 12/2014 | Guerenbourg et al. |
| 2015/0017000 | A1 | 1/2015 | Sato et al. |
| 2015/0055899 | A1 | 2/2015 | Kodama et al. |
| 2015/0159693 | A1 | 6/2015 | Corts |
| 2015/0204383 | A1 | 7/2015 | Ishii et al. |
| 2015/0330498 | A1 | 11/2015 | Carlino et al. |
| 2015/0369284 | A1 | 12/2015 | Hager et al. |
| 2016/0076522 | A1 * | 3/2016 | Rohden .................. F03D 80/60 416/9 |
| 2016/0327148 | A1 | 11/2016 | Dinter |
| 2018/0187719 | A1 | 7/2018 | Tulokas |
| 2020/0158090 | A1 | 5/2020 | Hager et al. |
| 2020/0173425 | A1 | 6/2020 | Schroeder |
| 2021/0102528 | A1 * | 4/2021 | Christoffersen ......... F16J 15/40 |

FOREIGN PATENT DOCUMENTS

| | | | | |
|---|---|---|---|---|
| AT | 519288 | A1 | 5/2018 | |
| AT | 15975 | U1 | 10/2018 | |
| AU | 650057 | B2 | 3/1992 | |
| AU | 2008331343 | A1 | 2/2010 | |
| CN | 101438068 | A | 5/2009 | |
| CN | 101965455 | A | 2/2011 | |
| CN | 102009663 | A | 4/2011 | |
| CN | 202082374 | U | 12/2011 | |
| CN | 102345676 | A | 2/2012 | |
| CN | 102418833 | A | 4/2012 | |
| CN | 102713276 | A | 10/2012 | |
| CN | 202811230 | U | 3/2013 | |
| CN | 103557124 | A | 2/2014 | |
| CN | 103765005 | A | 4/2014 | |
| CN | 104234949 | A | 12/2014 | |
| CN | 104819209 | A | 8/2015 | |
| CN | 104956101 | A | 9/2015 | |
| CN | 204627877 | U | 9/2015 | |
| CN | 106062391 | A | 10/2016 | |
| CN | 106164509 | A | 11/2016 | |
| CN | 106884972 | A | 6/2017 | |
| CN | 108026975 | A1 | 5/2018 | |
| CN | 108167442 | A1 | 6/2018 | |
| CN | 108884863 | A | 11/2018 | |
| DE | 37 02 008 | A1 | 8/1988 | |
| DE | 3726751 | A1 | 2/1989 | |
| DE | 10064261 | A1 | 7/2002 | |
| DE | 10 2005 001 344 | A1 | 7/2006 | |
| DE | 10 2005 018 836 | B3 | 12/2006 | |
| DE | 60219261 | T2 | 1/2008 | |
| DE | 10 2011 010 204 | A1 | 8/2012 | |
| DE | 10 2011 119 471 | A1 | 5/2013 | |
| DE | 10 2012 212 792 | A1 | 1/2014 | |
| DE | 10 2013 211 710 | B3 | 10/2014 | |
| DE | 10 2014 205 637 | A1 | 10/2015 | |
| DE | 102015201356 | A1 * | 7/2016 | |
| DE | 11 2013 003 034 | B4 | 8/2017 | |
| DK | 201670106 | A1 | 9/2017 | |
| EP | 1 564 406 | A1 | 8/2005 | |
| EP | 1 564 406 | A2 | 8/2005 | |
| EP | 2 003 334 | A1 | 12/2008 | |
| EP | 2 136 093 | A1 | 12/2009 | |
| EP | 2290269 | A1 | 3/2011 | |
| EP | 2 383 480 | B1 | 10/2012 | |
| EP | 2 568 163 | A1 | 3/2013 | |
| EP | 2 597 307 | A2 | 5/2013 | |
| EP | 2 600 037 | A1 | 6/2013 | |
| EP | 2620643 | A1 * | 7/2013 | ............. F03D 80/30 |
| EP | 2 657 519 | A1 | 10/2013 | |
| EP | 2 679 492 | A1 | 1/2014 | |
| EP | 2 711 568 | A1 | 3/2014 | |
| EP | 2816226 | A1 | 12/2014 | |
| EP | 2 863 076 | A1 | 4/2015 | |
| EP | 2 955 413 | A1 | 12/2015 | |
| EP | 3 012 479 | A1 | 4/2016 | |
| EP | 3 040 553 | A1 | 7/2016 | |
| EP | 3091242 | A1 | 11/2016 | |
| EP | 3 139 034 | A1 | 3/2017 | |
| EP | 3 173 642 | A1 | 5/2017 | |
| EP | 3 252 306 | A1 | 6/2017 | |
| EP | 3 279 471 | A1 | 2/2018 | |
| EP | 3 343 071 | A1 | 7/2018 | |
| EP | 3 396 187 | A1 | 10/2018 | |
| GB | 1405118 | A | 9/1975 | |
| GB | 2 201 200 | B | 8/1990 | |
| JP | S59-54812 | A | 3/1984 | |
| JP | H04-203566 | A | 7/1992 | |
| JP | H07-3248 | B2 | 1/1995 | |
| JP | H07-293556 | A | 11/1995 | |
| JP | H11-303857 | A | 11/1999 | |
| JP | 2002-195261 | A1 | 7/2002 | |
| JP | 2003176822 | A | 6/2003 | |
| JP | 2003194071 | A | 7/2003 | |
| JP | 2006-118552 | A | 5/2006 | |
| JP | 2010-101263 | A | 5/2010 | |
| JP | 2010151207 | A | 7/2010 | |
| JP | 2014-159861 | A | 9/2014 | |
| JP | 2015-001279 | A | 1/2015 | |
| JP | 2015140768 | A * | 8/2015 | |
| JP | 2017-048849 | A | 3/2017 | |
| KR | 2014-0143620 | A | 12/2014 | |
| WO | 2007/071239 | A1 | 6/2007 | |
| WO | 2008/152083 | A1 | 12/2008 | |
| WO | 2011/127509 | A1 | 10/2011 | |
| WO | 2011/127510 | A1 | 10/2011 | |
| WO | 2012/103913 | A1 | 8/2012 | |
| WO | 2013/191163 | A1 | 12/2013 | |

(56) References Cited

FOREIGN PATENT DOCUMENTS

| WO | 2014/005587 | A1 |   | 1/2014 |           |
|----|-------------|----|---|--------|-----------|
| WO | WO-2014109043 | A1 | * | 7/2014 | ............. F03D 15/00 |
| WO | 2014/117196 | A1 |   | 8/2014 |           |
| WO | 2014/173808 | A1 |   | 10/2014 |          |
| WO | 2017/144058 | A1 |   | 8/2017 |           |
| WO | 2018/071941 | A1 |   | 4/2018 |           |

OTHER PUBLICATIONS

International Search Report in PCT/AT2019/060424, mailed Apr. 3, 2020.
International Search Report in PCT/AT2019/060425, mailed Apr. 14, 2020.
International Search Report in PCT/AT2019/060421, mailed Apr. 3, 2020.
International Search Report in PCT/AT2019/060426, mailed Apr. 7, 2020.
International Search Report in PCT/AT2019/060419, mailed Mar. 26, 2020.
Li Yunlong, Discussion on Localization of Composite Material Sliding Bearing in Hydropower Projects, Hongshui River, vol. 35, Issue 2, 4 pages, with English Abstract at the end of the document, Apr. 2016.

* cited by examiner

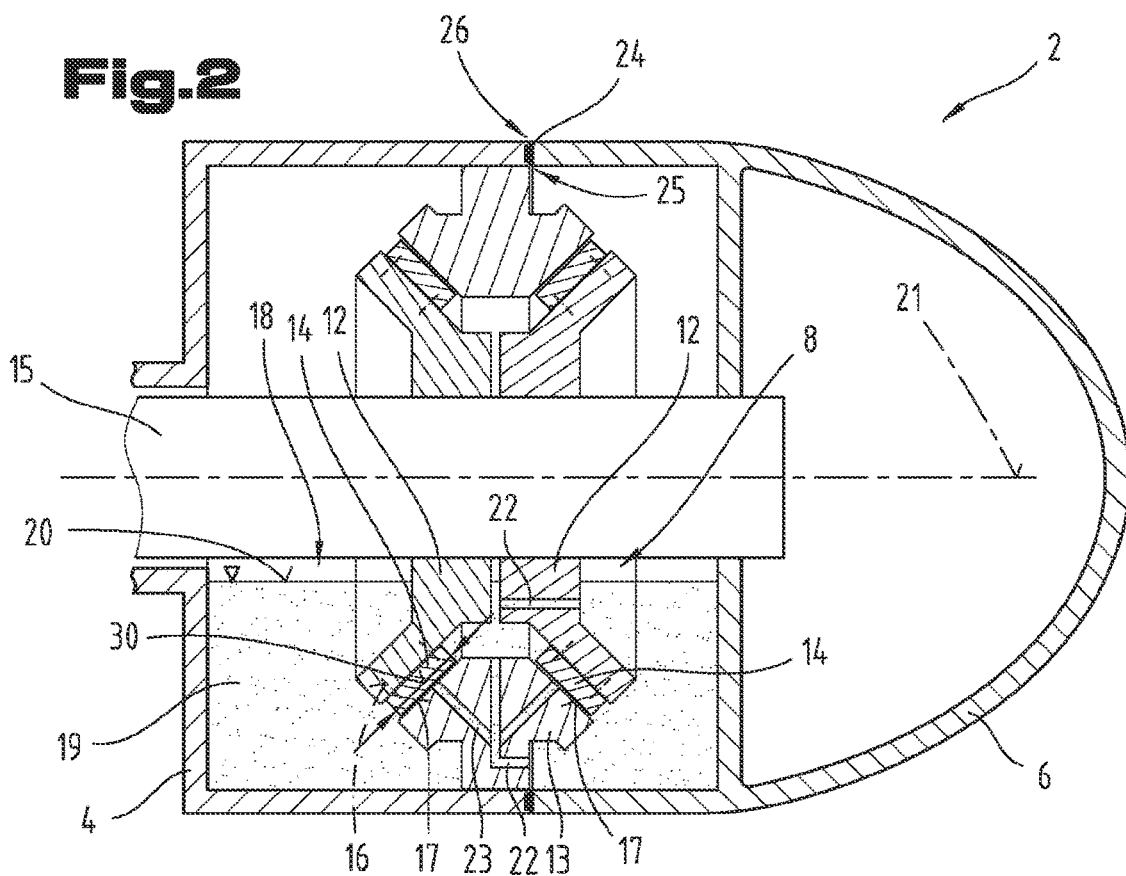
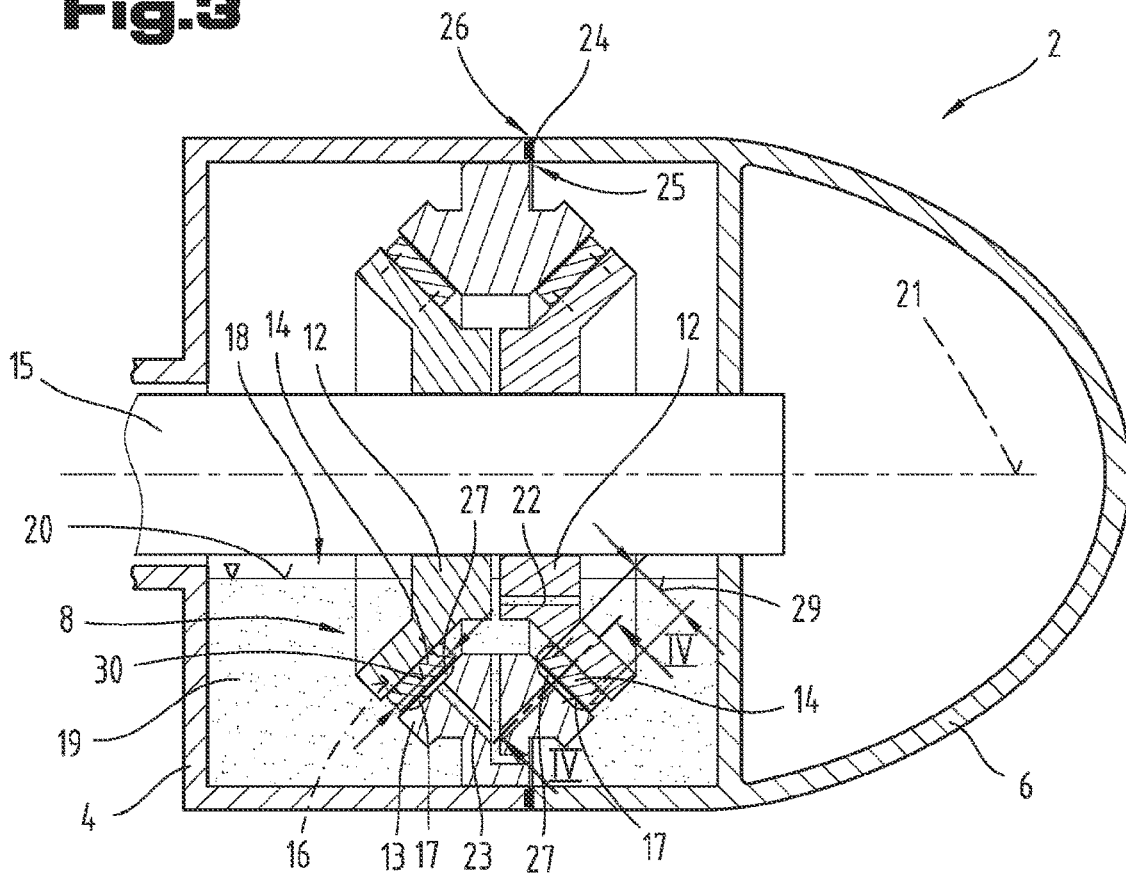

NACELLE FOR A WIND TURBINE

CROSS REFERENCE TO RELATED APPLICATIONS

This application is the National Stage of PCT/AT2019/060425 filed on Dec. 9, 2019 which claims priority under 35 U.S.C. § 119 of Austrian Application No. A 51113/2018 filed on Dec. 13, 2018, the disclosure of which is incorporated by reference. The international application under PCT article 21(2) was not published in English.

The invention relates to a nacelle for a wind turbine as well as to a wind turbine equipped with a nacelle.

From EP2863076A1, a rotor bearing for a nacelle of a wind turbine is known. The rotor bearing known from EP2863076A1 has only a low energy efficiency.

It was the object of the present invention to overcome the disadvantages of the prior art and to provide a nacelle for a wind turbine with improved energy efficiency.

This object is achieved by means of a nacelle and a wind turbine according to the claims.

According to the invention, a nacelle for a wind turbine is provided. The nacelle comprises:
a nacelle housing;
a rotor hub;
a rotor bearing for bearing the rotor hub on the nacelle housing, wherein the rotor bearing has at least one inner ring element and at least one outer ring element, wherein at least one oil-lubricated sliding bearing element is formed between the inner ring element and the outer ring element. A sealing element is formed between the nacelle housing and the rotor hub and/or between the nacelle housing and a rotor shaft. The sealing element is formed for sealing a lubricating oil sump, wherein the lubricating oil sump serves to receive that lubricating oil which serves for the lubrication of the oil-lubricated sliding bearing element.

The nacelle according to the invention has the advantage that, by means of the sealing element, an improved sealing of the nacelle can be achieved, which in particular makes the use of hydrodynamic sliding bearings for the application in the rotor bearing possible.

Moreover, it may be useful if the sealing element is designed as an axial seal, which is arranged between a front side of the nacelle housing and a front side of the rotor hub.

In an alternative, it may be provided that the sealing element is designed as a radial seal, which is arranged between the nacelle housing and the rotor hub and/or between the nacelle housing and the rotor shaft.

In addition to this, it may be provided that the sealing element is designed as a mechanical end-face seal. Particularly by means of a mechanical end-face seal, a good sealing effect for sealing the nacelle can be achieved.

A design according to which it may be provided that the sealing element comprises at least two segments, which can be put over the rotor shaft in the radial direction, is also advantageous. This entails the advantage that the sealing element can be replaced easily without having to remove the rotor shaft. This facilitation of the maintenance of the rotor shaft can be achieved in particular by the sealing element not being closed entirely but rather having a segmented design and thus being able to be opened to allow putting it radially over the shaft.

According to an advancement, it is possible that the sealing element is designed as a labyrinth seal. A labyrinth seal, in particular, can have a long lifespan in the present case of application and have a sufficient sealing effect particularly when the sealing element is not immersed in the lubricating oil sump.

Furthermore, it may be useful if the labyrinth seal has a return line, which leads into the lubricating oil sump. By this measure, an undesired lubricant leakage out of the nacelle can be mostly avoided. The return line may, for example, be realized in the form of a bore, which leads from a dip of the sealing labyrinth in the direction of the lubricating oil sump. However, the return line may also be formed by an inner wall at the labyrinth located closer to the lubricating oil sump being lower than an outer wall at the labyrinth located further away from the lubricating oil sump.

In addition to this, it may be provided that the sealing element is accommodated in the nacelle housing, and the rotor hub is rotatable relative to the sealing element. Particularly a seal formed in such a way and/or an installation situation of the seal formed in such a way leads to the lowest possible wear of the sealing element. Hence, the durability of the sealing element can be increased.

Moreover, it may be provided that the sealing element contacts a sealing surface, which is movable relative to the sealing element, wherein the sealing surface has a sliding lacquer coating. Particularly in such a design of the sealing element, the durability of the wind turbine can be increased.

According to a particular design, it is possible that a sliding sleeve is arranged on the rotor hub or on the rotor shaft, which sliding sleeve cooperates with the sealing element. Particularly when using a sliding sleeve, the durability of the sealing element can be increased.

According to an advantageous advancement, it may be provided that an oil drip element in the form of a plunge-cut groove or of an elevation. By these measures, it can be achieved that the sealing effect of the sealing element can be improved.

In particular, it may be advantageous if two sealing elements are formed so as to be axially spaced apart from each other. Hence, the lubricating oil sump can be sealed on both sides, when viewed in the axial direction of the axis of rotation, in order to prevent a leakage of lubricating oil out of the nacelle on one side, and to bind the lubricating oil in the nacelle housing in the region of the lubricating oil sump on the second side.

Furthermore, it may be provided that a sealing element is formed between the nacelle housing and the rotor hub and/or between the nacelle housing and a rotor shaft.

Preferably, the sealing surface comprises a material that is selected from a group comprising aluminum base alloys, bismuth base alloys, silver base alloys, anti-friction varnishes. Particularly these wear resistant and tribologically particularly effective materials have proven particularly advantageous in wind turbines with a high power density. Surprisingly, anti-friction varnishes in particular can be used well as a sliding layer although they have a Vickers hardness of about 25 HV (0.001) to 60 HV (0.001), meaning they are significantly softer than previously described sliding layers, wherein here, increasing the hardness by adding corresponding hard particles is possible.

Moreover, it is possible that a polymer-based running-in layer is arranged on the sealing surface, in order to thereby achieve a better adaptability of the sealing surface to the sealing element during the running-in of the sealing element.

The materials used as anti-friction varnishes may, for example be polytetrafluoroethylene, resins containing fluorine such as perfluoroalkoxy copolymers, polyfluoroalkoxy-polytetrafluoroethylene copolymers, ethylene tetrafluoroethylene, polychlorotrifluoroethylene, fluorous ethylene-propylene copolymers, polyvinyl fluoride, polyvinylidene fluoride, alternating copolymers, static copolymers such as fluorinated ethylene propylene, polyesterimides, bis-maleimides, polyimide resins such as carborane imides, aromatic polyimide resins, hydrogen-free polyimide resins, polytriazo-pyromellithimides, polyamideimides, in particular aromatic ones, polyaryletherimides, possibly modified with isocyanates, polyetherimides, possible modified with isocyanates, epoxy resins, epoxy resin esters, phenolic resins, polyamide 6, polyamide 66, polyoxymethylene, silicones, polyaryl ethers, polyaryl ketones, polyaryletherketones, polyarylether-etherketones, polyetheretherketones, polyether ketones, polyvinylidene difluorides, polyethylensulfides, allylene sulfides, polytriazo-pyromellithimides, polyesterimides, polyarylsulfides, polyvinylenesulfides, polyphenylene sulfide, polysulfones, polyethersulfones, polyarylsulfones, polyaryloxides, polyarylsufides as well as copolymers thereof.

A pressure-increasing device within the meaning of this document is a device, which is configured to increase the pressure of the lubricating oil by means of external energy input. Such a pressure-increasing device is, for example, a hydraulic pump.

In addition to a nacelle housing, a nacelle within the meaning of this document also comprises a rotor hub and a rotor bearing for bearing the rotor hub.

The inner ring element and/or the outer ring element can each be formed as independent components, which may be coupled with the rotor hub or rotor shaft and/or with the nacelle housing. In the alternative to this, it is also conceivable that the inner ring element is formed as an integral element of the rotor hub and/or the rotor shaft. In the alternative to this, it is also conceivable that the outer ring element is formed as an integral element of the rotor hub and/or the rotor shaft. In the alternative to this, it is also conceivable that the inner ring element is formed as an integral element of the nacelle housing. In the alternative to this, it is also conceivable that the outer ring element is formed as an integral element of the nacelle housing.

For the purpose of better understanding of the invention, it will be elucidated in more detail by means of the figures below.

Figure 4:
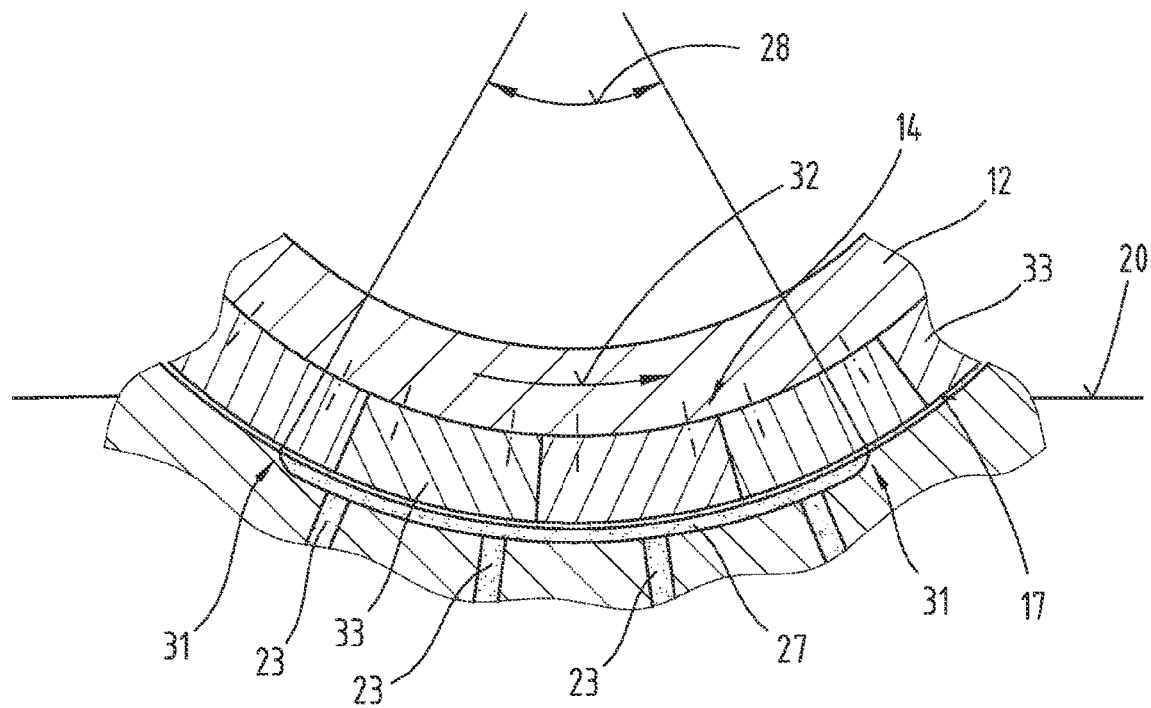
Figure 5:
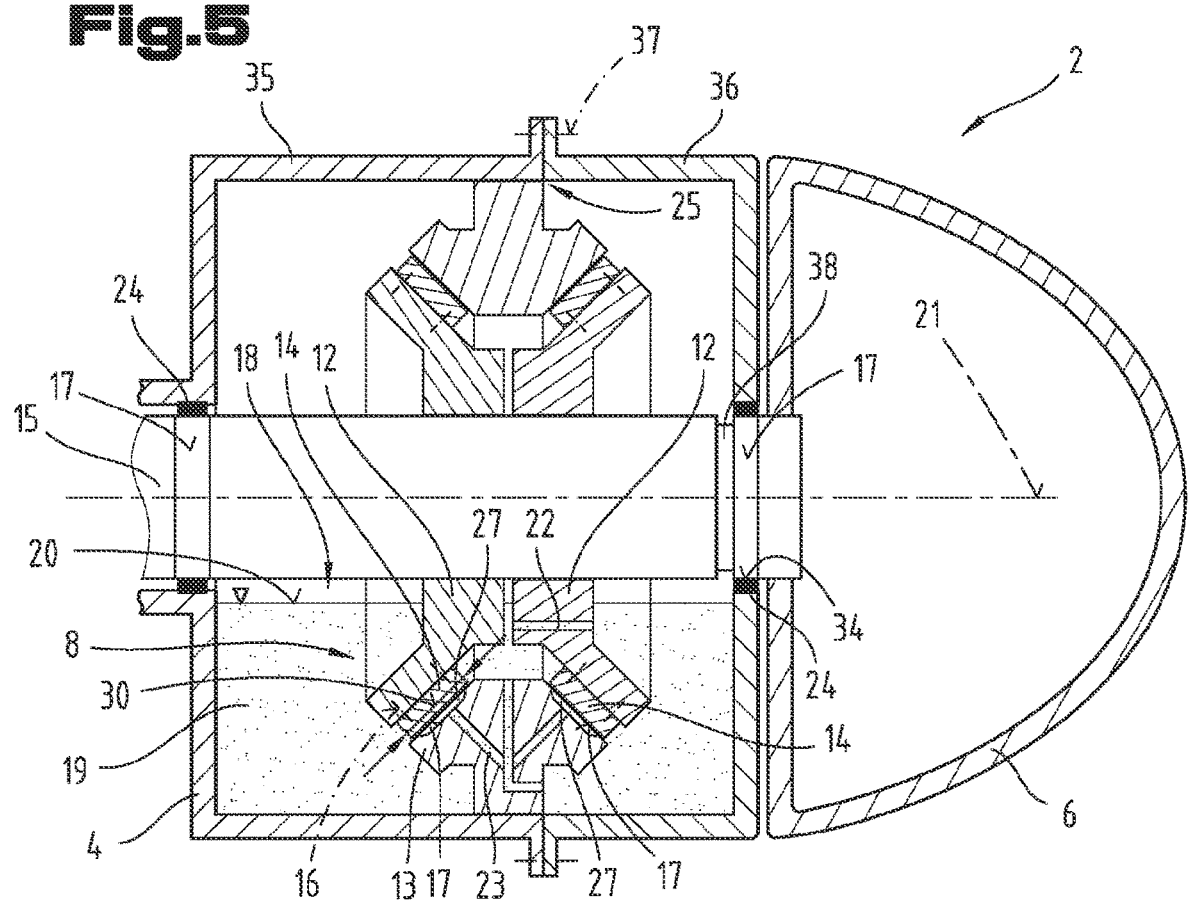
Figure 6:
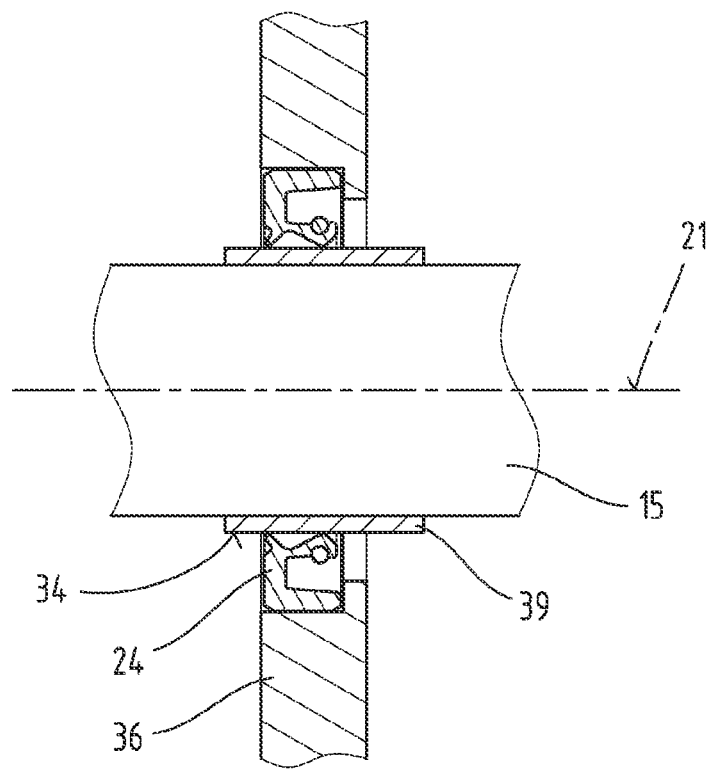
Figure 7:
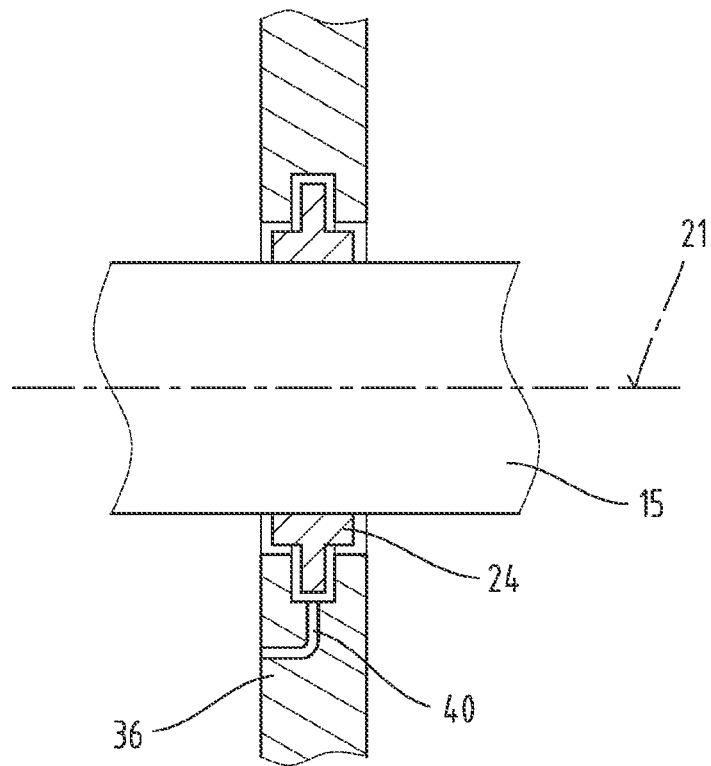

These show in a respectively very simplified schematic representation:

FIG. 1 a schematic representation of a wind turbine;

FIG. 2 a cross-section of a nacelle in a very schematic representation;

FIG. 3 a cross-section of the nacelle with a flow channel in the outer ring element;

FIG. 4 a sectional view of the outer ring element with the flow channel;

FIG. 5 a cross-section of a nacelle with a parted nacelle housing in a very schematic representation;

FIG. 6 an exemplary embodiment of a mechanical seal with a sliding surface formed on a sleeve;

FIG. 7 an exemplary embodiment of a labyrinth seal with an oil drain.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14 is arranged between the inner ring element 12 and the outer ring element 13.

As can be seen from FIG. 2, it may be provided that the inner ring element 12 is coupled with the rotor hub 6. In particular, it may be provided that a rotor shaft 15 is formed, on which the rotor hub 6 is arranged. The inner ring element 12 can be received directly on the rotor shaft 15.

In a further exemplary embodiment that is not depicted, it may of course also be provided that the inner ring element 12 is received directly on the rotor hub 6.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14 are each formed so as to be spaced apart from each other on the V-shaped flank between the two ring elements 12, 13, which sliding bearing elements 14 are arranged at an angle to one another. As can be seen from FIG. 2, an exemplary embodiment may provide that the sliding bearing elements 14 are fastened to the inner ring element 12 by means of a fastening means 16. Hence, a sliding surface 17 may be formed between the sliding bearing elements 14 and the outer ring element 13. In an arrangement of the sliding bearing elements 14 as it is shown in FIG. 2, the sliding surfaces 17 may also be arranged in a V-shape.

As can also be seen from FIG. 2, it may be provided that the inner ring element 12 is designed to be parted with regard to its axial extension, in order to make the assembly of the rotor bearing 8 easier.

In an exemplary embodiment that is not depicted, it is of course also conceivable that the inner ring element 12 does not form a groove as shown in the exemplary embodiment of FIG. 2, but rather that the V-shaped arrangement has a reverse formation, so that a V-shaped projection is formed on the inner ring element 12. In this case, it may be provided for the purpose of an easier assembly that the outer ring element 13 is designed to be parted in its axial extension.

Both in a design with an inner ring element 12 partible in the axial extension and in a design with an outer ring element 13 partible in the axial extension, it may be provided that the individual parts of the respective partibly designed ring element 12, 13 are formed so as to be axially adjustable relative to one another, in order to be able to compensate for example the wear of the sliding bearing elements 14. In particular, it may be provided that due to the axial adjustability of the individual parts of the ring elements 12, 13 relative to one another, the bearing gap can be adjusted.

As can further be seen from FIG. 2, it is provided that a lubricating oil sump 18 is formed, which serves for receiving lubricating oil 19. In the operating state, the lubricating oil sump 18 is filled with lubricating oil 19 up to a lubricating oil level 20. In this regard, the lubricating oil level 20 is selected such that the sliding surfaces 17 are at least partially below the lubricating oil level 20 and thus are immersed in the lubricating oil 19 situated in the lubricating oil sump 18.

The sliding bearing elements 14 are designed as hydrodynamic sliding bearings, whereby a lubricating oil film forms on the sliding surface 17 when the rotor hub 6 rotates about a rotor axis 21, which lubricating oil film serves the hydrodynamic bearing of the sliding bearing element 14.

For introducing lubricating oil 19 to the sliding surface 17, it may be provided that lubricating oil bores 22 are formed in the inner ring element 12 and/or in the outer ring element 13, which lubricating oil bores 22, depending on the rotation position of the rotor hub 6, open into the lubricating oil sump 18 at a first longitudinal end and end into an intermediate space between the inner ring element 12 and the outer ring element 13 at their second longitudinal end. By this measure, it can be achieved that sufficient lubricating oil 19 can be introduced to the sliding bearing element 14.

Moreover, it is also possible for lubricating oil bores 23 to be provided which open directly into the sliding surface 17. By means of these lubricating oil bores 23, the sliding surface 17 can be fluidically connected directly to the lubricating oil sump 18, so that sufficient lubricating oil 19 can be introduced to the sliding surface 17. In particular, it may be provided that due to the movement of the sliding bearing element 14 relative to the outer ring element 13, lubricating oil 19 is sucked into the sliding surface 17 via the lubricating oil bore 23 and/or the lubricating oil bore 22 and there, a lubricating oil film for the lubrication and/or bearing of the sliding bearing element 14 is formed. In order to achieve a good lubricating effect of the sliding bearing element 14, it may be provided that, as shown in FIG. 2, at least a section of the sliding surface 17, with regard to its width, is situated entirely below the lubricating oil level 20.

Moreover, it may be provided that a sealing element 24 is formed, which serves to seal the rotor hub 6 from the nacelle housing 4. As can be seen from FIG. 2, it may be provided that the sealing element 24 acts between a front side 25 of the nacelle housing 4 and between a front side 26 of the rotor hub 6. In particular, it may be provided that the lubricating oil sump 18 extends over both the nacelle housing 4 and the rotor hub 6 and thus, the sealing element 24 is situated below the lubricating oil level 20 at least in some sections.

As can further be seen from FIG. 2, it may be provided that the sealing element 24 is accommodated in the nacelle housing 4.

FIG. 3 shows a further and possibly independent embodiment of the nacelle 2, wherein again, equal reference numbers and/or component designations are used for equal parts as in FIGS. 1 through 2 above. In order to avoid unnecessary repetitions, it is pointed to/reference is made to the detailed description in FIGS. 1 through 2 preceding it.

As can be seen from FIG. 3, it may be provided that a flow channel 27 is formed in the outer ring element 13, which flow channel 27 is fluidically connected to the lubricating oil bores 23 and serves the improved distribution of lubricating oil 19 in the sliding surface 17.

FIG. 4 shows a sectional view according to section line IV-IV in FIG. 3. As can be seen from FIG. 4, it may be provided that the flow channel 27 extends over a flow channel angle 28, which is preferably selected such that the flow channel 27 is arranged entirely below the lubricating oil level 20. In particular, it may be provided that the flow channel angle 28 is between 10° and 160°, preferably between 45° and 80°.

Moreover, it is provided that a flow channel width 29 is selected such that it is smaller than a width 30 of the sliding bearing element 14. As can be seen from FIG. 4, it may be provided that multiple of the lubricating oil bores 23 open into the flow channel 27. Moreover, it may be provided that the flow channel 27 tapers off in the shape of a wedge gap 31. By this measure, a lubrication film can be formed.

In a first exemplary embodiment, it may be provided that the flow channel 27 on both sides in the circumferential direction tapers off in the shape of a wedge gap 31.

In a further exemplary embodiment, it may be provided that, viewed in the main direction of rotation 32, the wedge gap 31 is formed only at the end of the flow channel 27.

As can further be seen from FIG. 4, it may be provided that the sliding bearing element 14 has multiple sliding bearing pads 33, which are arranged on the inner ring element 12 so as to be distributed across the circumference. The sliding bearing pads 33 may in particular be arranged on the inner ring element 12, such that a continuous sliding surface 17 is formed, which can act as a hydrodynamic bearing. In particular, it may be provided that the sliding surface 17 has the shape of a frustum.

FIG. 5 shows a further and possibly independent embodiment of the nacelle 2, wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

As can be seen from FIG. 5, it may be provided that the lubricating oil sump 18 is formed entirely in the nacelle housing 4. In this regard, it may in particular be provided that the sealing elements 24, in particular their sealing surface 34, are situated entirely above the lubricating oil level 20. In order to enable and/or facilitate the assembly and/or the maintenance of a nacelle housing 4 and/or rotor bearing 8 constructed in such a manner, it may be provided that the nacelle housing 4 has a main part of the housing 35 and a lubricating oil sump lid 36. In particular, it may be provided that the main part of the housing 35 and the lubricating oil sump lid 36 delimit the lubricating oil sump 18. In this regard, it may be provided that the lubricating oil sump lid 36 is fastened to the main part of the housing 35 by means of a fastening means 37.

As can be seen from FIG. 5, it may be provided that, one sealing element 24 each is arranged on either side of the lubricating oil sump 18, when viewed in the axial direction of the rotor axis 21. In particular, it may be provided that the sealing elements 24 are formed as a radial direction. One of the sealing elements 24 can, in this regard, be arranged in the main part of the housing 35, the second of the sealing elements 24 may be arranged in the lubricating oil sump lid 36.

Moreover, it may be provided that the sealing elements 24 cooperate with the rotor shaft 15. In particular, it may be provided here that the sliding surface 17 is formed on the rotor shaft 15. In particular, it may be provided that for this purpose, the rotor shaft 15 locally has a particularly formed surface, which is formed for example by a sliding lacquer coating. Such a sliding lacquer coating may particularly be provided when using mechanical seals.

Moreover, it may be provided that an oil drip element 38 is formed on the rotor shaft 15, which oil drip element 38 serves to prevent lubricating oil 19 from reaching the sealing element 24 along the rotor shaft 15 in the axial direction. The oil drip element 38 may for example be designed in the form of a plunge-cut groove. In an alternative embodiment variant, it may also be provided that the oil drip element 38 is designed, for example, in the form of a circumferential elevation on the rotor shaft 15.

FIG. 6 shows a further exemplary embodiment of the arrangement of the sealing element 24 in a detailed view. As can be seen from FIG. 6, it may be provided that a sliding sleeve 39 is arranged on the rotor shaft 15, on which sliding sleeve 39 the sealing surface 34 is formed. Such an arrangement may particularly be useful when using mechanical seals.

In a further exemplary embodiment that is not depicted, it may also be provided that the sliding sleeve 39 is received directly on the rotor hub 6, and the sealing element 24 thus serves to seal the rotor hub 6.

FIG. 7 shows a further exemplary embodiment of sealing element 24. As can be seen from FIG. 7, it may be provided that the sealing element 24 is designed in the form of a labyrinth seal, which for example cooperates with the lubricating oil sump lid 36. In particular, it may be provided that a return line 40 is formed, which serves to return the lubricating oil 19 into the lubricating oil sump 18. As can be seen in FIG. 7, the return line may be designed in the form of a bore, which starts at the lowest point of the labyrinth seal and leads into the lubricating oil sump 18.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 wind turbine
2 nacelle
3 tower
4 nacelle housing
5 rotor
6 rotor hub
7 rotor blade
8 rotor bearing
9 radial force
10 axial force
11 tilting torque
12 inner ring element
13 outer ring element
14 sliding bearing element
15 rotor shaft
16 fastening means
17 sliding surface
18 lubricating oil sump
19 lubricating oil
20 lubricating oil level
21 rotor axis
22 lubricating oil bore of the ring element
23 lubricating oil bore
24 sealing element
25 front side of the nacelle housing
26 front side of the rotor hub
27 flow channel
28 flow channel angle
29 flow channel width 30 width of the sliding bearing element 31 wedge gap 32 main direction of rotation 33 sliding bearing pad 34 sealing surface 35 main part of the housing 36 lubricating oil sump lid 37 fastening element 38 oil drip element 39 sliding sleeve 40 return line

The invention claimed is:

1. A nacelle for a wind turbine, the nacelle comprising:
a nacelle housing;
a rotor hub; and
a rotor bearing for bearing the rotor hub on the nacelle housing;
wherein the rotor bearing has at least one inner ring element and at least one outer ring element;
wherein at least one oil-lubricated sliding bearing element of the rotor bearing is formed between the inner ring element and the outer ring element;
wherein a sealing element is formed between the nacelle housing and the rotor hub and/or between the nacelle housing and a rotor shaft;
wherein the sealing element seals a lubricating oil sump in the rotor hub;
wherein the lubricating oil sump serves to receive that lubricating oil which serves for the lubrication of the oil-lubricated sliding bearing element;
wherein in the operating state, the lubricating oil sump is filled with lubricating oil up to a lubricating oil level; and wherein a sliding surface of the oil-lubricated sliding bearing element is at least partially below the lubricating oil level.

2. The nacelle according to claim 1, wherein the sealing element is designed as an axial seal, which is arranged between a front side of the nacelle housing and a front side of the rotor hub.

3. The nacelle according to claim 1, wherein the sealing element is designed as a radial seal, which is arranged between the nacelle housing and the rotor hub and/or between the nacelle housing and the rotor shaft.

4. The nacelle according to claim 1, wherein the sealing element is designed as a mechanical end-face seal.

5. The nacelle according to claim 1, wherein the sealing element comprises at least two segments, which can be put over the rotor shaft in a radial direction.

6. The nacelle according to claim 1, wherein the sealing element is provided in the form of a labyrinth seal.

7. The nacelle according to claim 6, wherein the labyrinth seal has a return line which leads into the lubricating oil sump.

8. The nacelle according to claim 1, wherein the sealing element is accommodated in the nacelle housing and the rotor hub can be rotated relative to the sealing element.

9. The nacelle according to claim 1, wherein the sealing element contacts a sealing surface, which is movable relative to the sealing element, wherein the sealing surface has a sliding lacquer coating.

10. The nacelle according to claim 1, wherein a sliding sleeve is arranged on the rotor hub or on the rotor shaft, which sliding sleeve cooperates with the sealing element.

11. The nacelle according to claim 1, wherein an oil drip element in the form of a plunge-cut groove or of an elevation is formed on the rotor shaft.

12. The nacelle according to claim 1, wherein two sealing elements, which are axially spaced apart from each other, are formed.

* * * * *